United States Patent
Ogino

Patent Number: 6,081,819
Date of Patent: Jun. 27, 2000

[54] ELECTRONIC CALCULATOR WITH GRAPH DISPLAYING FUNCTION

[75] Inventor: Masanori Ogino, Yamatokoriyama, Japan

[73] Assignee: Sharp Kabushiki Kaisha, Osaka, Japan

[21] Appl. No.: 09/057,498

[22] Filed: Apr. 9, 1998

[30] Foreign Application Priority Data

May 9, 1997 [JP] Japan .................................. 9-119590

[51] Int. Cl.⁷ ...................................................... G06F 3/14
[52] U.S. Cl. .............................................................. 708/174
[58] Field of Search ............................................. 708/174

[56] References Cited

U.S. PATENT DOCUMENTS

| | | | |
|---|---|---|---|
| 5,210,708 | 5/1993 | Negishi .................................. | 708/174 |
| 5,245,559 | 9/1993 | Lapeyre .................................. | 708/174 |
| 5,289,394 | 2/1994 | Lapeyre .................................. | 708/174 |
| 5,519,646 | 5/1996 | Uemura et al. ......................... | 708/174 |
| 5,535,317 | 7/1996 | Tanaka et al. .......................... | 708/174 |
| 5,732,001 | 3/1998 | Nakayama et al. ..................... | 708/174 |
| 5,901,074 | 5/1999 | Nakano et al. ......................... | 708/174 |

FOREIGN PATENT DOCUMENTS

09297656  11/1997  Japan .

*Primary Examiner*—David H. Malzahn
*Attorney, Agent, or Firm*—Nixon & Vanderhye P.C.

[57] ABSTRACT

An electronic calculator with a graph displaying function includes: an input device having various function keys for inputting data and performing various functions; a display device for displaying one of screen images including a numerical value image, a numerical formula image, or a graph image inputted from the input device; a first storage device for storing a control program; a second storage device for if storing at least one of the screen images; and a control device for controlling each of the input device, the display device, the first storage device, and the second storage device by means of the control program, wherein the control device allows a screen image displayed successively on the display device to be stored in the second storage device by a screen storage operation of the input device, and allows each screen image to be successively read out and displayed on the display device in an order of storage in the second storage device by a screen display operation of the input device.

14 Claims, 9 Drawing Sheets

ELECTRONIC CALCULATOR WITH GRAPH DISPLAYING FUNCTION

CROSS-REFERENCES TO RELATED APPLICATIONS

This application is related to Japanese Patent Application No. HEI 9(1997)-119590 filed on May 9, 1997 whose priority is claimed under 35 USC § 119, the disclosure of which is incorporated herein by reference in its entirety.

BACKGROUND OF THE INVENTION

1. Field of the Invention

The present invention relates to an electronic calculator with a graph displaying function. More particularly, the present invention relates to an electronic calculator with a graph displaying function capable of storing a plurality of screen images having a graph or the like drawn thereon.

2. Description of the Related Arts

Conventional electronic calculators with a graph displaying function can merely store data such as a numeral, a character string, and a formula in a storage device by individually attaching an index thereto.

Therefore, when one of these data stored in the storage device is to be deleted or rearranged, it is necessary to select an object from these data and edit the object only on the basis of the index attached to the object, raising a problem that the object is liable to be mistakenly edited.

Moreover, in such a conventional electronic calculator, it is not possible to store a drawn screen image as it is. Therefore, when a calculation of a formula or a display of a graph involving a complex and time-consuming calculation is to be repeated for a number of times, it is necessary to perform calculation again by using the stored formula before drawing and displaying the graph. In other words, every time the data are displayed, the indices of the data must be designated and recalled, and the same procedure must be repeated for a number of times, which is a cumbersome operation.

In the meantime, as an electronic calculator applicable to an OHP (Over Head Projector) in a conference or a meeting, Japanese Unexamined Patent Publication No. HEI 09(1997)-297656 proposes an electronic apparatus comprising a receiving device and a transmission-type display device for OHP, in which a mark indicating an arbitrary position of the data or graph displayed on a display device can be pointed at and operated on the data input device side capable of transmitting data without the pointing operation on the main body side.

According to the above electronic apparatus disclosed in Japanese Unexamined Patent Publication No. HEI 09(1997)-297656, the displayed data can be pointed at clearly by moving the mark to an arbitrary position relative to the data or graph. However, the above electronic apparatus is not constructed in such a manner that, by successively reading out and displaying a plurality of displayed data which are stored, the contents of the displayed data are dynamically expressed in some sort so that the contents of the displayed data may be better understood.

SUMMARY OF THE INVENTION

The present invention has been made in view of the above-mentioned circumstances and the purpose thereof is to provide an electronic calculator with a graph displaying function in which a user can, for example, store in a storage device an arbitrary screen image having a graph or the like drawn thereon by a single key operation, read out and display a plurality of stored screen images successively for perusal, and edit data of these screen images by observing and confirming them on the screen.

Accordingly, the present invention provides an electronic calculator with a graph displaying function comprising: an input device having various function keys for inputting data and performing various functions; a display device for displaying one of screen images including a numerical value image, a numerical formula image, or a graph image inputted from the input device; a first storage device for storing a control program; a second storage device for storing at least one of the screen images; and a control device for controlling each of the input device, the display device, the first storage device, and the second storage device by means of the control program, wherein the control device allows a screen image displayed successively on the display device to be stored in the second storage device by a screen storage operation of the input device, and allows each screen image to be successively read out and displayed on the display device in an order of storage in the second storage device by a screen display operation of the input device.

BRIEF DESCRIPTION OF THE DRAWINGS

The present invention will be better understood from the following detailed description of preferred embodiments of the invention, taken in conjunction with the accompanying drawings, in which.

DETAILED DESCRIPTION OF THE PREFERRED EMBODIMENTS

Preferred embodiments of the present invention are now detailed with reference to the attached drawings. However, these embodiments and the drawings are not intended to limit the scope of the present invention.

Figure 1:
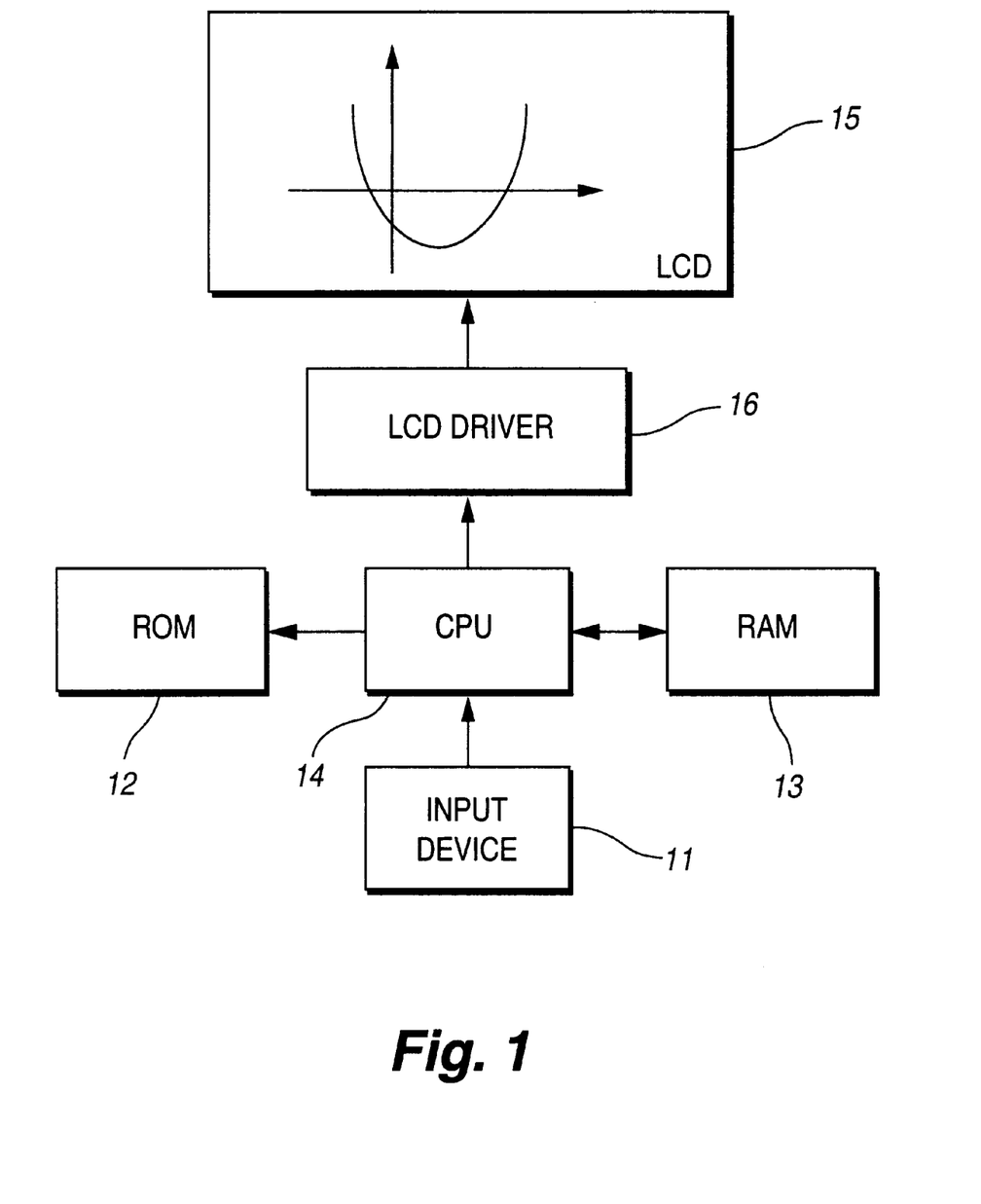
FIG. 1 is a block diagram showing an electric construction of an electronic calculator with a graph displaying function according to the present invention.

FIG. 1 is a block diagram showing an electric construction of an electronic calculator with a graph displaying function according to the present invention.

Referring to FIG. 1, the electronic calculator with a graph displaying function includes an input device 11, a first storage device (ROM; read-only memory) 12, a second storage device (RAM; random-access memory) 13, a control device (CPU; central control unit) 14, a display device (LCD; liquid crystal display) 15, and a display control device (LCD driver) 16. The input device 11 is equipped with various function keys for inputting data for performing various calculation processes (for example, "store screen" key and "up/down" keys for switching screens). The first storage device (ROM) 12 stores an operation program for executing and controlling the key inputs, various calculation processes, and display of the input data and results of the calculation processes. The second storage device (RAM) 13 stores data for executing and controlling the key inputs, various calculation processes, and display of the input data and results of the various calculation processes. The control device (CPU) 14 executes and controls the key inputs, various calculation processes, and display of the input data and results of various calculation processes. The display device (LCD) 15 displays the input data and the results of various calculation processes including a graph. The display control device (LCD driver) 16 performs control for displaying on the LCD 15 the display data supplied by the CPU 14.

The CPU 14 allows the RAM 13 to successively store the screen image displayed on the LCD 15 for each screen storing operation of the input device 11 and allows a plurality of screen images to be successively read out and displayed on the LCD 15 in the order of their storage in the RAM 13 by the screen display operation of the input device 11.

This construction allows a screen image to be stored in the RAM 13 for each key operation and allows a plurality of screen images to be successively displayed on the LCD 15 in the order of their storage in the RAM 13. Therefore, the contents of the screen images are dynamically expressed in some sort, so that the contents of the screen images can be better understood.

Also, when a deletion mode is set by the screen edit operation of the input device 11, the CPU 14 may read out an object screen image from the RAM 13 and display it on the LCD 15 by the screen display operation of the input device 11, and then determine the screen image to be an object of deletion and delete the screen image from the RAM 13. This construction allows the user to delete and edit the screen image data while confirming them on the screen, so that generation of deletion mistakes and the like can be prevented.

Further, when a rearrangement mode is set by the screen edit operation of the input device 11, the CPU 14 may successively read out a plurality of screen images from the RAM 13 and display them on the display device 15 by the screen display operation of the input device 11, determine a source screen image and a destination screen image from the displayed screen images, and rearrange and write the screen image data stored in the RAM 13 so that the source screen image is transferred to the position of the destination screen image. This construction allows the user to rearrange and edit the screen image data while confirming them on the screen, so that generation of rearrangement mistakes and the like can be prevented.

Figure 2:
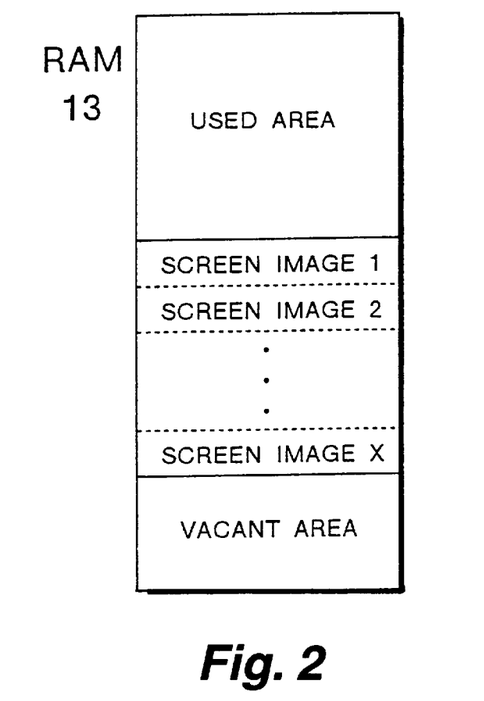
FIG. 2 is a view showing an exemplary inner structure of a RAM according to the present invention.

FIG. 2 is a view showing an exemplary inner structure of the RAM 13, in which later-mentioned screen image 1, screen image 2, . . . are sequentially stored (saved) in vacant areas.

Each screen image corresponds to an image of one whole screen on the LCD 15. The data length (data size) of each screen image is the same.

Figure 3:
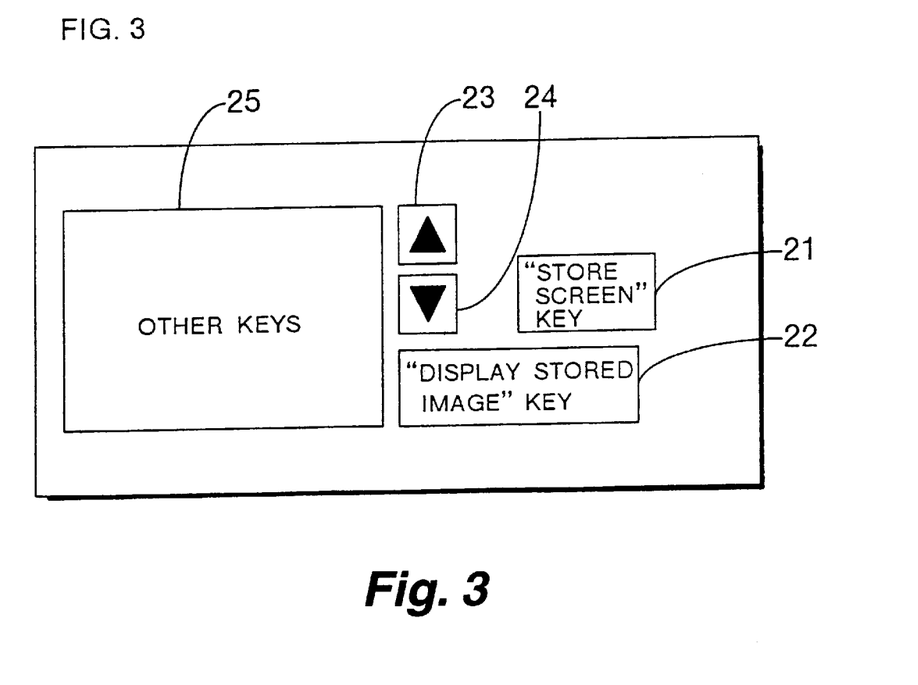
FIG. 3 is a view showing an exemplary key input section of an input device according to the present invention.

FIG. 3 is a view showing an exemplary key input section of the input device 11, which includes a screen storage key 21, a stored screen display key 22, an up key 23, a down key 24, and a group of other keys 25 for displaying edit menus and the like.

The CPU 14 controls various operations as shown below. When the screen storage key 21 in the key input section is pressed, the screen image displayed at that time on the LCD 15 is stored in a vacant area in the RAM 13 as a data. In other words, an arbitrary screen image displayed on the LCD 15 is stored (saved) at a vacant site in the RAM 13 by pressing the screen storage key 21 alone. This operation is effective as long as the vacant area in the RAM 13 is larger than the data length of the screen image.

Also, when the stored screen display key 22 in the key input section is pressed, the first screen image 1 stored in the RAM 13 is displayed on the LCD 15.

Further, when the up key 23 in the key input section is pressed, the CPU displays on the LCD 15 a screen image (for example, screen image 1) stored in the RAM 13 at a site immediately above the screen image (screen image 2) which is now being displayed on the screen. When the down key 24 in the key input section is pressed, the CPU displays on the LCD 15 a screen image (for example, screen image 2) stored in the RAM 13 at a site immediately below the screen image (screen image 1) which is now being displayed on the screen. However, if the screen image which is now being displayed on the LCD 15 is a screen image which is stored at the first site (or the last site) of the vacant area in the RAM 13, the up key 23 (or the down key 24) is not actuated.

In other words, a screen image in the RAM 13 can be displayed on the LCD 15 simply by pressing the stored screen display key 22. Thereafter, by pressing the up key 23 or the down key 24, the screen images are successively displayed on the LCD 15 in an order by which the screen images are stored in the RAM 13.

Also, when the user enters the deletion mode from the edit menu displayed on the LCD 15, the first screen image 1 in the screen images stored in the RAM 13 is displayed on the LCD 15. Thereafter, a screen image stored immediately above or below is successively displayed on the LCD 15 every time the up key 23 or the down key 24 is pressed. If an execution key (not shown) in the key input section is pressed, the data of the screen image displayed at that time on the LCD 15 are deleted from the RAM 13. At this time, the data of the screen images stored subsequent to the deleted screen image move successively upward in the storage area of the RAM 13. In other words, the vacant areas are successively occupied by the subsequent data.

Further, when the user enters the rearrangement mode from the edit menu displayed on the LCD 15, the CPU 14 displays on the LCD 15 the first screen image 1 in the screen images stored in the RAM 13 and, thereafter, the CPU 14 successively displays on the LCD 15 a screen image stored immediately below every time the down key 24 is pressed. When the execution key (not shown) in the key input section is pressed, the screen image displayed at that moment on the LCD 15 is determined as the screen image to be transferred (the source screen image). Subsequently, the up key 23 or the down key 24 is pressed, whereby the CPU 14 displays on the LCD 15 a screen image located immediately below the site to which the source screen image is to be transferred. When the execution key is pressed at this state, the site of the presently displayed screen image is determined as the destination. By this operation, the CPU 14 transfers the source screen image to a storage area of the destination on the RAM 13. In accordance with this transfer, the screen images that need to be transferred are successively moved upwards or downwards in the storage area.

Next, the operations of the electronic calculator with a graph displaying function as constructed above are specifically explained for the cases of (1) the screen storage display mode, (2) the deletion mode, and (3) the rearrangement mode.

(1) Screen Storage Display Mode

Figure 4:
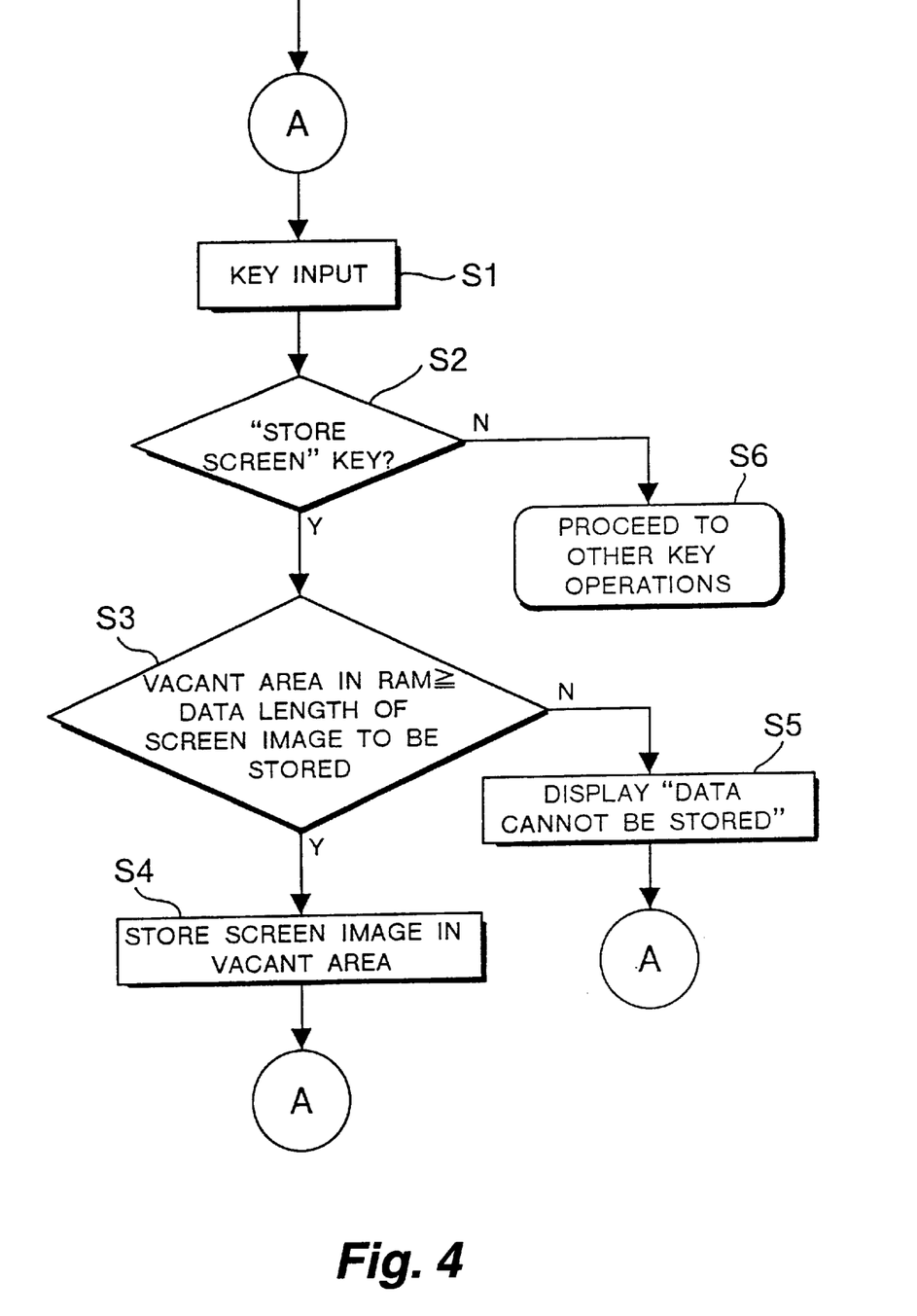
FIG. 4 is an operational flow chart in a screen storage mode according to the present invention.
Figure 5:
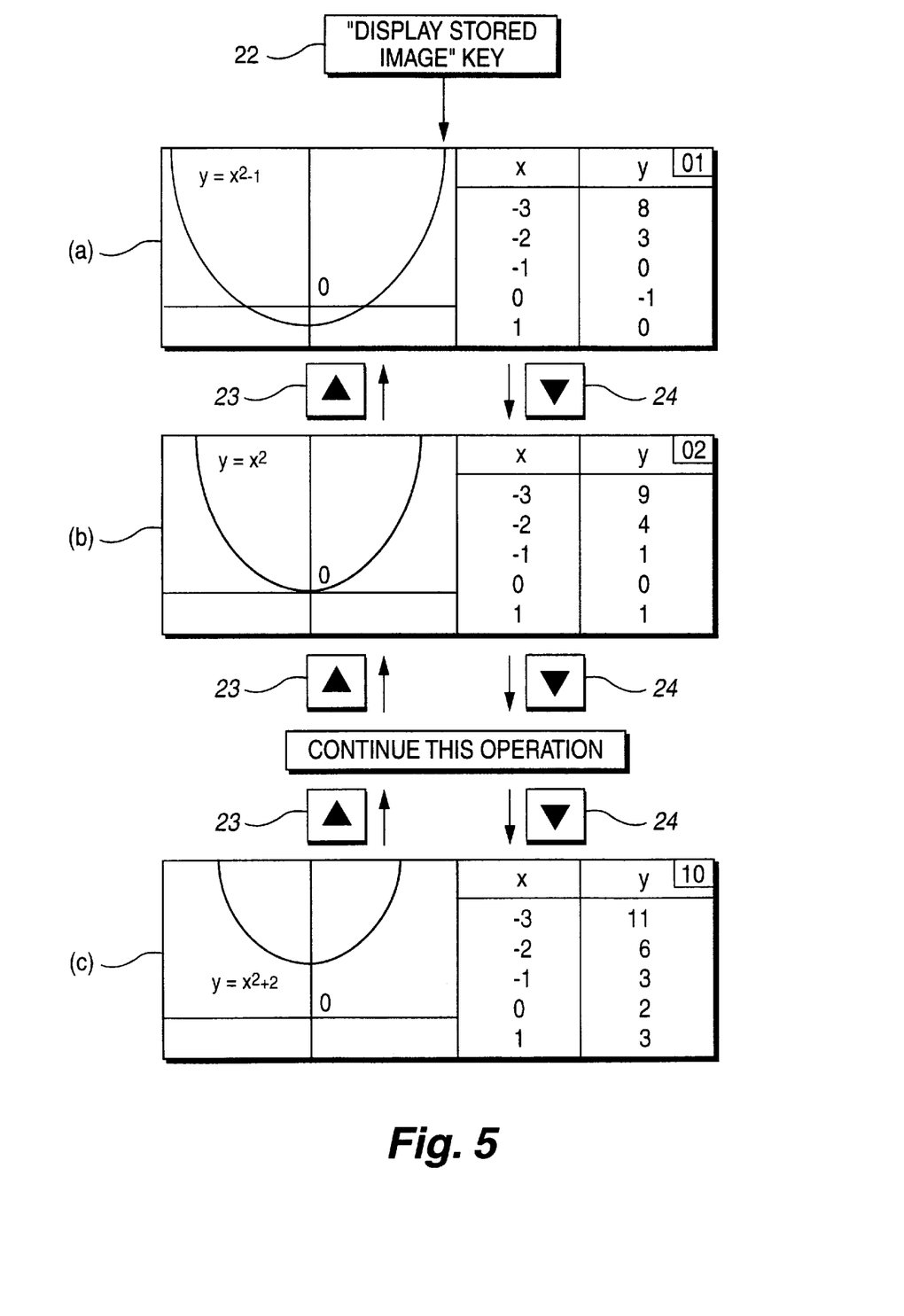
FIG. 5 is a view showing an exemplary screen display in a stored screen display mode according to the present invention.

FIG. 4 is an operational flow chart in storing a screen, and (a) to (c) in FIG. 5 show exemplary screen displays in a stored screen display mode.

When the screen storage key 21 in the key input section is pressed (steps S1 and S2), the vacant area in the RAM 13 and the data length of the screen image to be stored are compared (step S3). If the vacant area is larger than the data length of the screen image, the screen image displayed at that moment on the LCD 15 is stored (saved) as screen image data in the vacant area of the RAM 13 (step S4). On the other hand, if the vacant area is smaller than the data length of the screen image in the step S3, the CPU 14 displays on the LCD 15 a message such as "the data cannot be stored" (step S5). Also, if another key is pressed, the CPU 14 performs a process corresponding to the pressed key (step S6).

Through these steps, the data from the screen image 1 to the screen image x are successively stored in a vacant area subsequent to the already used area in the RAM 13, as shown in FIG. 2.

When the stored screen display key 22 in the key input section is pressed at this state of storage, the first screen image 1 (See (a) of FIG. 5) stored in the RAM 13 is displayed on the LCD 15. At this time, a number indicating the place (ranking) of the screen image is also displayed at one end (in this case, at an upper right corner) of the screen.

Thereafter, when the down key 24 in the key input section is pressed once, the screen image 2 ((b) of FIG. 5) in the RAM 13, which is stored immediately below the screen image 1 ((a) of FIG. 5) now on display, is displayed on the LCD 15. Further, if the down key 24 in the key input section is pressed eight times in this state, the screen image 10 ((c) of FIG. 5) in the RAM 13, which is stored at the eighth site below the screen image 2 ((b) of FIG. 5) now on display, is displayed on the LCD 15. However, if the screen image displayed now on the LCD 15 is the screen image x which is stored at the last site of the vacant area in the RAM 13, the down key 24 is not actuated upon being pressed.

Also, when the up key 23 in the key input section is pressed once, for example, at the state in which the screen image 2 shown by (b) of FIG. 5 is displayed, the screen image 1 ((a) of FIG. 5) in the RAM 13, which is stored immediately above the screen image 2 ((b) of FIG. 5) now on display, is displayed on the LCD 15. However, if the screen image displayed now on the LCD 15 is the screen image 1 which is stored at the first site of the vacant area in the RAM 13, the up key 23 is not actuated upon being pressed.

(2) Deletion Mode

Figure 6:
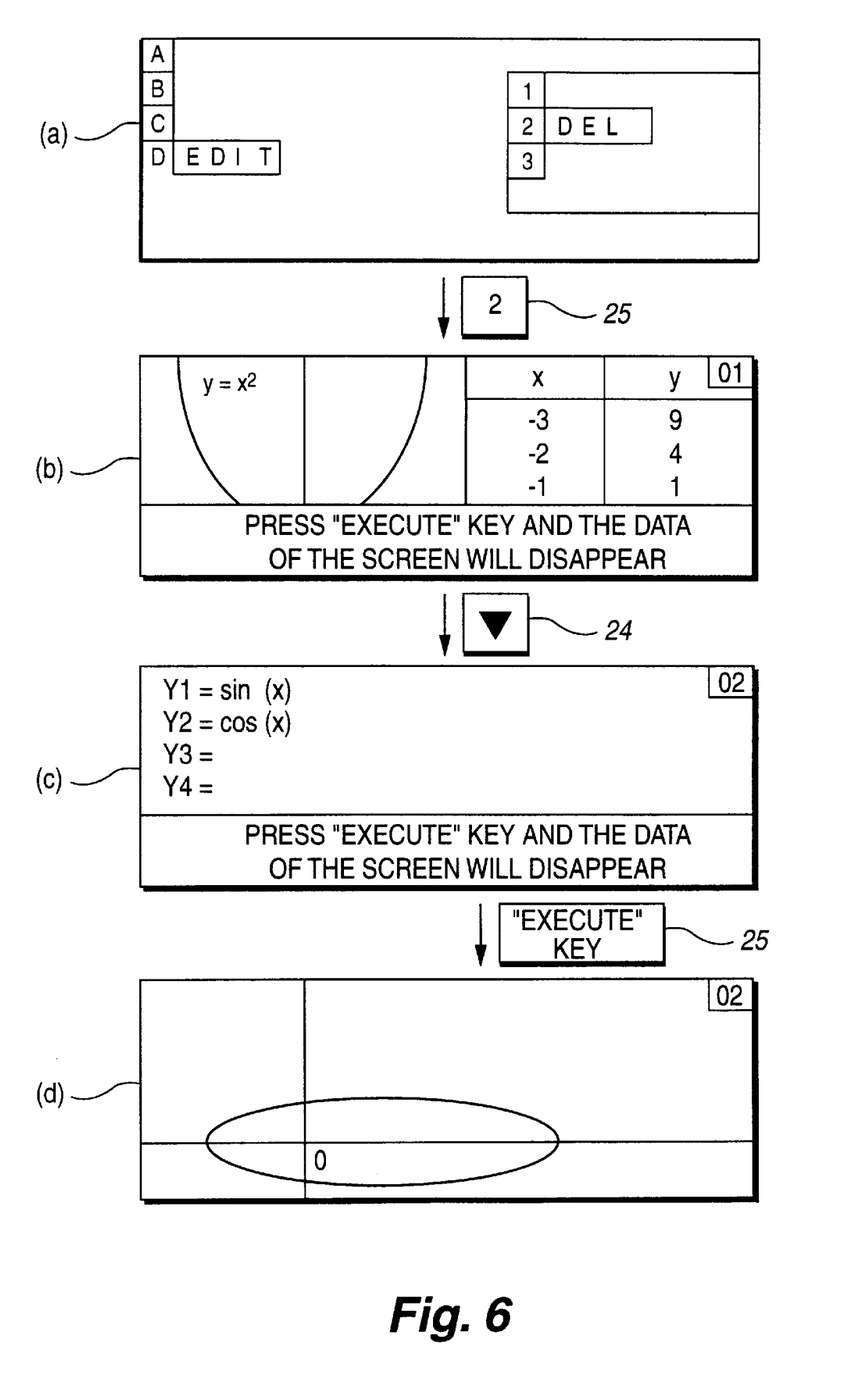
FIG. 6 is a view showing an exemplary screen display in a deletion mode according to the present invention.

In FIG. 6, (a) to (d) show exemplary screen displays in the deletion mode.

Namely, when the user enters the deletion mode from the edit menu ((a) of FIG. 6) displayed on the LCD 15, the first screen image 1 in the screen images stored in the RAM 13 is displayed on the LCD 15 ((b) of FIG. 6). Thereafter, a screen image stored immediately below is successively displayed on the LCD 15 every time the user presses the down key 24 in the key input section while observing and confirming the screen. Referring to FIG. 6, (c) shows a state in which the down key 24 has been pressed once, where the screen image 2 is displayed on the LCD 15.

Figure 7:
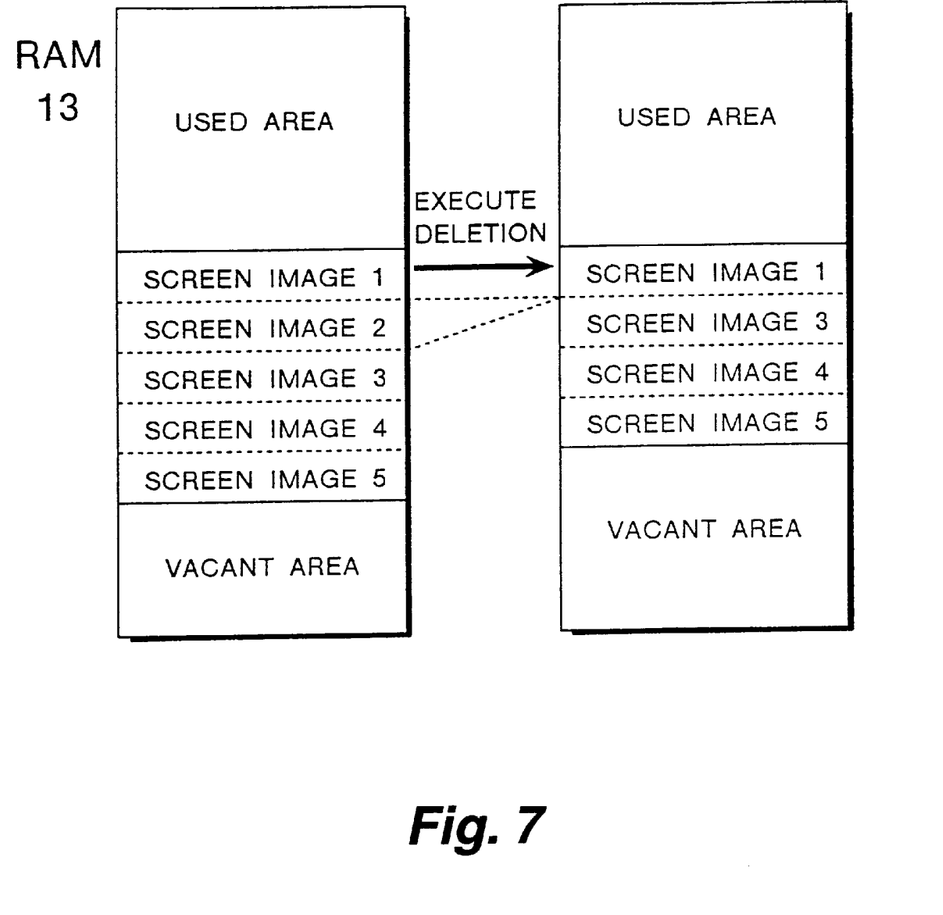
FIG. 7 is a view showing how data are transferred on the RAM when the deletion mode is carried out according to the present invention.

Subsequently, when the user presses an execution key in the key input section after observing and confirming the screen, the screen image 2 displayed at that moment on the LCD 15 disappears ((d) of FIG. 6) and, at the same time, the data of the screen image 2 are deleted from the RAM 13. At this time, the data of the screen images 3, 4, 5 stored subsequent to the deleted screen image 2 move successively upward in the RAM 13, as shown in FIG. 7. In other words, the vacant site is successively occupied by the subsequent data.

(3) Rearrangement Mode

Figure 8:
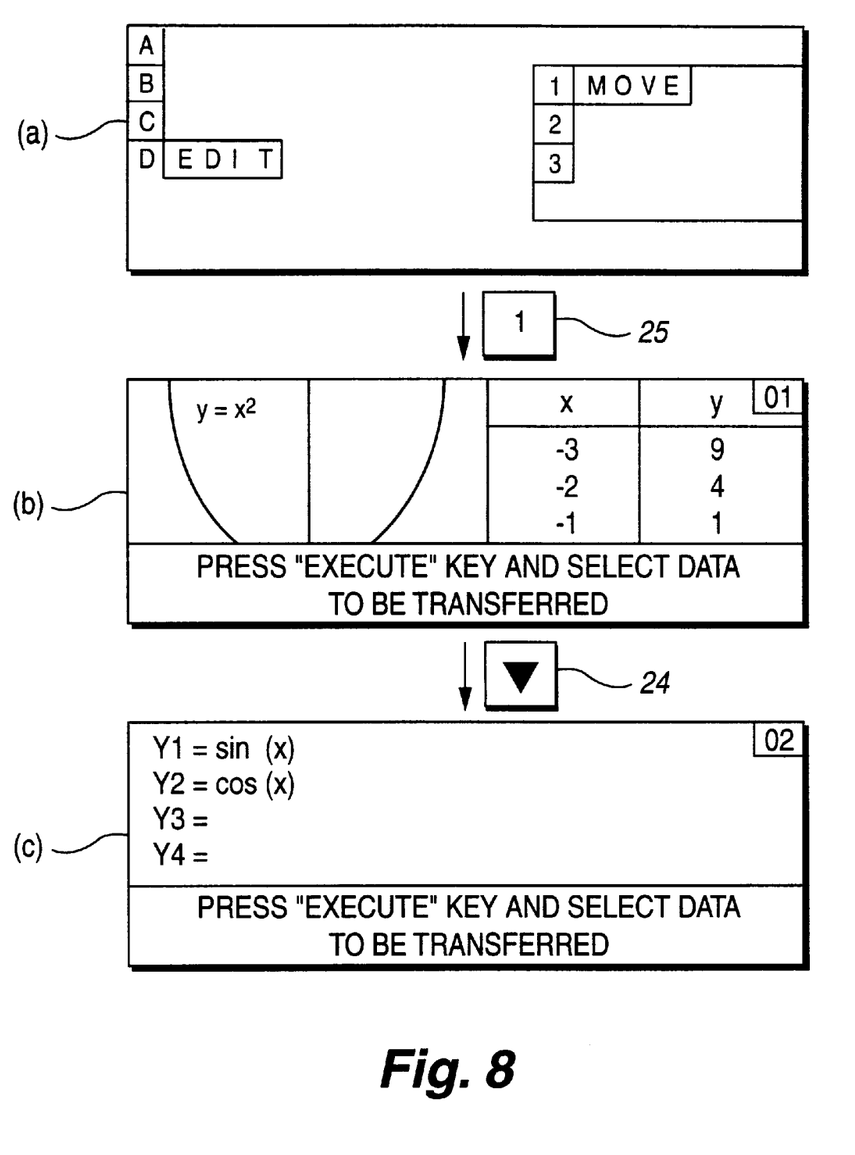
FIG. 8 is a view showing an exemplary screen display in a rearrangement mode according to the present invention.
Figure 9:
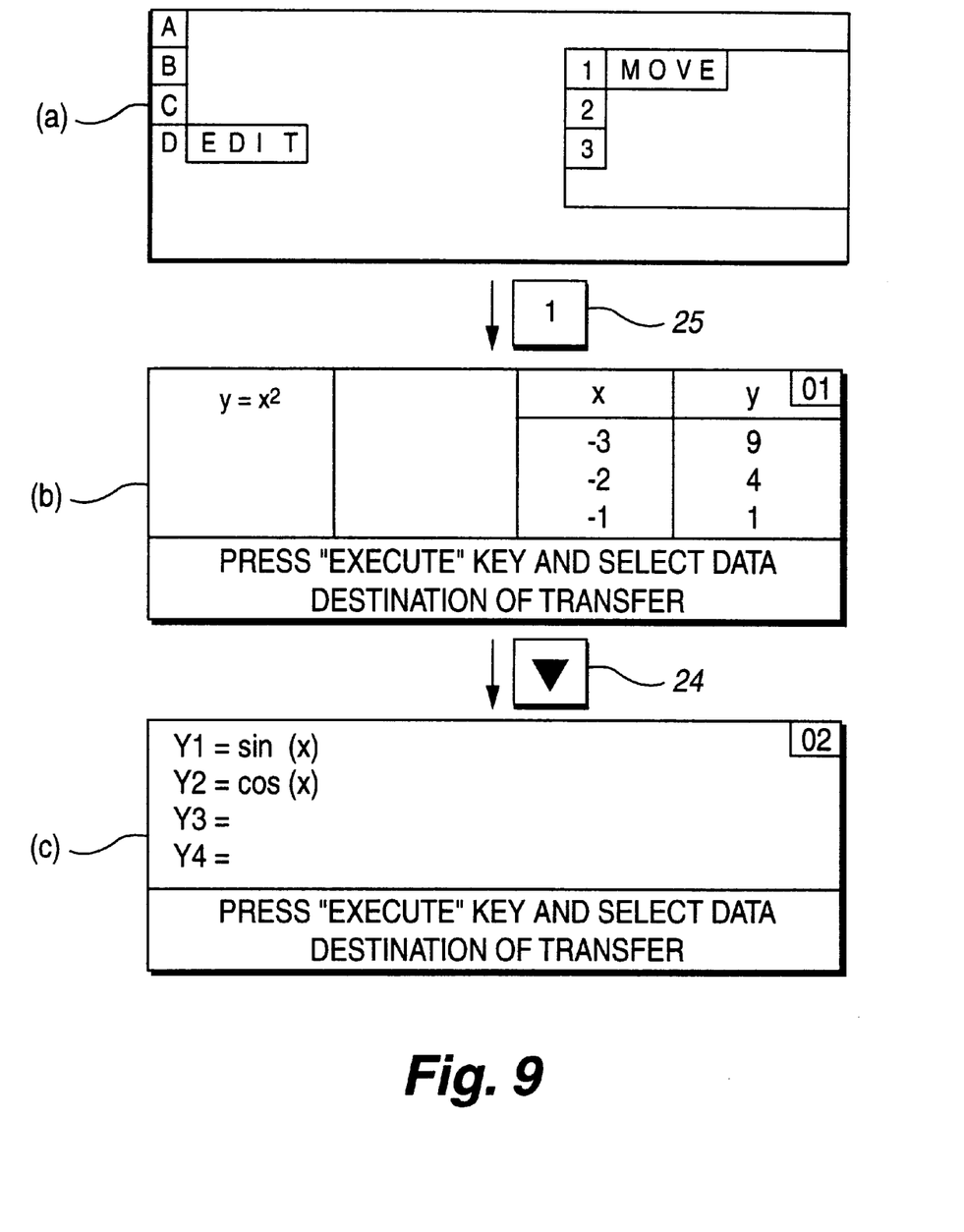
FIG. 9 is a view showing an exemplary screen display in the rearrangement mode according to the present invention.

In FIGS. 8 and 9, (a) to (f) show exemplary screen displays in the rearrangement mode.

Namely, when the user enters the rearrangement mode from the edit menu ((a) of FIG. 8) displayed on the LCD 15, the CPU displays on the LCD 15 the first screen image 1 in the screen images stored in the RAM 13 ((b) of FIG. 8). Thereafter, the CPU successively displays on the LCD 15 a screen image stored immediately below every time the user presses the down key 24 in the key input section while observing and confirming the screen. Referring to FIG. 8, (c) shows a state in which the down key 24 has been pressed once, where the screen image 2 is displayed on the LCD 15.

Figure 10:
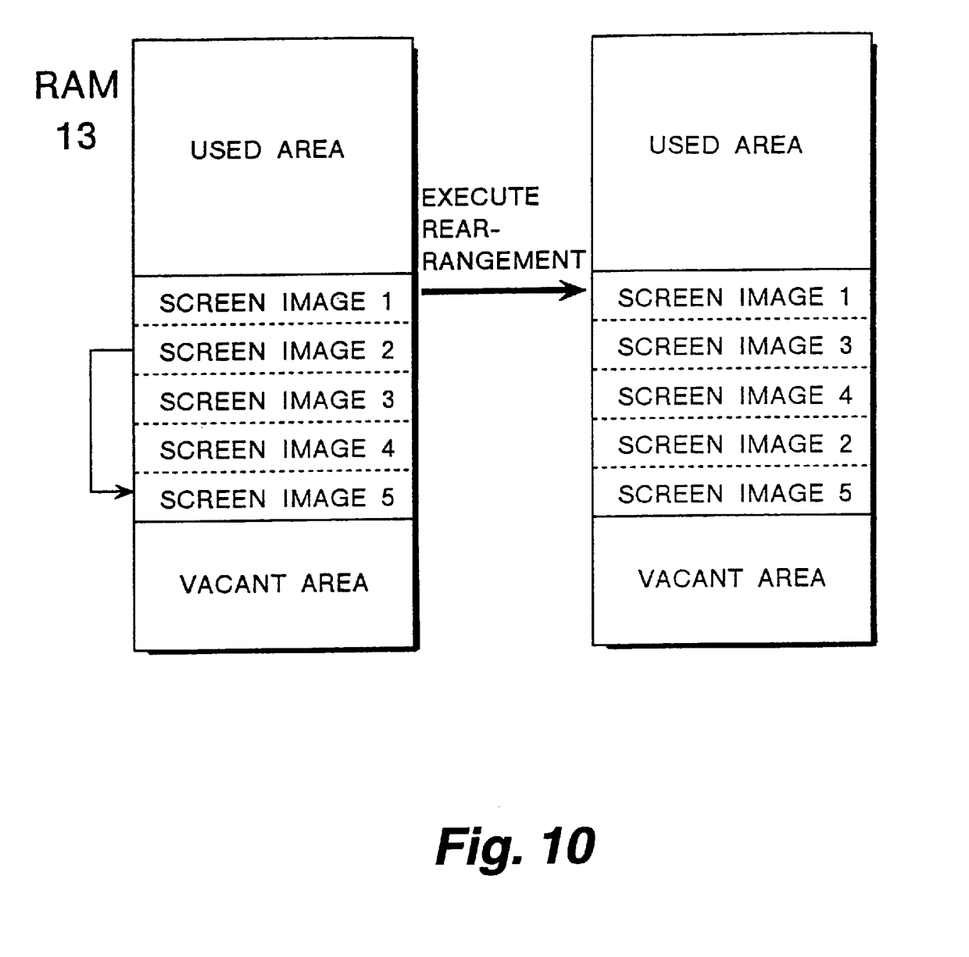
FIG. 10 is a view showing how data are transferred on the RAM when the rearrangement mode is carried out according to the present invention.

Subsequently, when the user presses the execution key in the key input section after observing and confirming the screen, the screen image 2 displayed at that moment on the LCD 15 is determined as the source screen image. Then, the user presses the down key 24, for example, three times while observing the screen shown in (d) of FIG. 9 if the user intends to transfer the screen image 2 at a site subsequent to the screen image 4 (i.e. prior to the screen image 5). By this operation, the CPU 14 displays on the LCD 15 the screen image 5 ((e) of FIG. 9) located immediately below the site to which the source screen image is to be transferred (i.e. the screen image 4 of the destination). Accordingly, by pressing the execution key at this state, the user determines the site subsequent to the screen image 4 (i.e. prior to the screen image 5) as the destination. At this time, the data of the screen images 2, 3, 4 are transferred in the RAM 13 so that the source screen image 2 comes subsequent to the destination screen image 4 (i.e. prior to the screen image 5), as shown in FIG. 10. Namely, since the source screen image 2 has been transferred down by two sites, the data of the screen image 3 and the screen image 4 each move upwards by one site.

Thus, the present invention provides the following effects.

(1) A plurality of screen images are stored successively in the storage device in order to display screen images of numerical formula or graphs obtained from complex and time-consuming calculation. This allows a screen image to be displayed quickly when the screen image is needed for a number of times. Also, the screen images can be displayed successively on the screen in the order of their storage in the storage device, thereby facilitating perusal and display of the stored screen image data.

(2) The user can delete and edit the screen image data while confirming them on the screen, so that generation of deletion mistakes and the like can be prevented.

(3) The user can rearrange and edit the screen image data while confirming them on the screen, so that generation of rearrangement mistakes and the like can be prevented.

Although the present invention has fully been described by way of example with reference to the accompanying drawings, it is to be understood that various changes and modifications will be apparent to those skilled in the art. Therefore, unless otherwise such changes and modifications depart from the scope of the invention, they should be construed as being included therein.

What we claim is:

1. An electronic calculator with a graph displaying function comprising:
   an input device having various function keys for inputting data and performing various operations, the operations including screen storage, screen display, deletion and rearrangement;
   a display device for displaying screen images, the screen images including numerical value images, numerical formula images, and graphic images inputted from the input device;
   a first storage device for storing a control program;
   a second storage device for successively storing the screen images; and
   a control device for controlling the input device, the display device, the first storage device, and the second storage device by means of the control program,
   wherein the control device
      stores separate screen images displayed on the display device successively in the second storage device upon initiation of the screen storage operation by the input device,
      successively reads out and displays on the display device in their order of storage, screen images stored in the second storage device upon initiation of the screen display operation by the input device.

2. The electronic calculator with a graph displaying function according to claim 1 wherein the control device reads out and displays on the display device at least a first one of the screen images stored in the second storage device and deletes a first selected one of the displayed screen images from the second storage device upon the initiation of the deletion operation by the input device.

3. An electronic calculator as recited in claim 2, wherein the deletion operation is initiated by pressing a screen edit key in the input device and selecting a deletion mode from an edit menu displayed on the display device in response to pressing the screen edit key.

4. An electronic calculator as recited in claim 3, wherein the first selected display screen that is deleted is selected by displaying successive display screens stored in the second storage device using scrolling keys in the input device and deleted by pressing an execution key in the input device.

5. The electronic calculator with a graph displaying function according to claim 1 wherein the control device successively reads out and displays on the display device at least a first one of the screen images stored in the second storage device and designates a first selected one of the displayed screen images to be a source screen image, successively reads out and displays on the display device at least a second one of the screen images stored in the second storage device and designates a second selected one of the displayed screen images to be a destination screen image, and rearranges and re-stores the screen images stored in the second storage device so that the source screen image is transferred to a storage location in the second storage device just preceding that of the destination screen image upon the initiation of the rearrangement operation by the input device.

6. An electronic calculator as recited in claim 5, wherein the rearrangement operation is initiated by pressing a screen edit key in the input device and selecting a rearrangement mode from an edit menu displayed on the display device in response to pressing the screen edit key.

7. An electronic calculator as recited in claim 6, wherein the source screen image is selected by displaying a first time successive display screens stored in the second storage device using scrolling keys in the input device and pressing a first time for the first selected screen image an execution key in the input device, and wherein the destination screen image is selected by displaying a second time successive display screens stored in the second storage device using the scrolling keys in the input device and pressing a second time for the second selected screen image the execution key in the input device.

8. An electronic calculator as recited in claim 1, wherein the control device, in performing the screen storage operation, compares a screen image to be stored to available storage space in the second storage device to determine if it can be stored.

9. An electronic calculator as recited in claim 8, wherein the screen storage operation is initiated by pressing a screen storage key in the input device.

10. An electronic calculator as recited in claim 1, wherein the control device, in performing the screen display operation, displays indicators showing the storage locations of the display screen images in the second storage device.

11. An electronic calculator as recited in claim 10, wherein the screen display operation is initiated by pressing a screen display key in the input device.

12. An electronic calculator with a graph displaying function comprising:
   an input device having various function keys for inputting various data and performing various operations, the operations including screen storage, screen display, deletion and rearrangement;
   a display device for displaying on a screen the various data inputted from the input device, the various data including numerical value images, numerical formula images, images of results of calculation processes and graphic images of the numerical formulas;
   a first storage device for storing a control program for executing instructions from the various function keys;
   a second storage device for storing the various data;
   a control device for executing the calculation processes and producing the graphic images of the numerical formulas based on the numerical values and the numerical formulas inputted from the input device, by means of the control program stored in the first storage device,
   wherein the control device controls such that
      the graphic images of the numerical formulas displayed on the display device are successively stored in the second storage device upon initiation of the screen display operation by the input device, and
      the plurality of graphic images of the numerical formulas successively stored in the second storage device are read out in a forward direction or in a rearward direction and displays on the screen of the display device by pressing an up key or a down key in the input device.

13. The electronic calculator with a graph display function as recited in claim 12, wherein in response to pressing a deletion key provided in the input device, the control device determines a graphic image of a numerical formula to be deleted, among the plurality of graphic images of the numerical formulas successively read out from the second storage device and displayed on the screen of the display device, and deletes from the second storage device the determined graphic image of the numerical formulas while the control device successively transfers to a vacant area and again stores the graphic images of the formulas not deleted.

14. The electronic calculator with a graph displaying function as recited in claim 12, wherein in response to pressing a rearrangement key provided in the input device, the control device determines a graphic image of a numerical formula to be rearranged, among the plurality of graphic images of the numerical formulas read out from the second storage device and displayed on the screen on the display device, and rearranges and again stores the individual graphic images of the numerical formulas stored in the second storage device.

* * * * *